United States Patent [19]

Omtzigt

[11] Patent Number: 6,023,759
[45] Date of Patent: Feb. 8, 2000

[54] SYSTEM FOR OBSERVING INTERNAL PROCESSOR EVENTS UTILIZING A PIPELINE DATA PATH TO PIPELINE INTERNALLY GENERATED SIGNALS REPRESENTATIVE OF THE EVENT

[75] Inventor: E. Theodore L. Omtzigt, Eldorado Hills, Calif.

[73] Assignee: Intel Corporation, Santa Clara, Calif.

[21] Appl. No.: 08/940,733

[22] Filed: Sep. 30, 1997

[51] Int. Cl.[7] .............................. G06F 9/38; G06F 11/28
[52] U.S. Cl. ............................... 712/227; 714/30; 714/35
[58] Field of Search .............................. 395/568, 183.06, 395/183.1, 183.11; 712/227; 714/30, 34, 35; 702/186, 187

[56] References Cited

U.S. PATENT DOCUMENTS

| | | | |
|---|---|---|---|
| 3,748,650 | 7/1973 | Garcia et al. ............................ | 395/838 |
| 5,343,478 | 8/1994 | James et al. ........................... | 371/22.31 |
| 5,479,652 | 12/1995 | Dreyer et al. ....................... | 395/183.06 |
| 5,491,793 | 2/1996 | Somasundaram et al. ........ | 395/183.21 |
| 5,561,761 | 10/1996 | Hicok et al. ....................... | 395/185.06 |
| 5,594,864 | 1/1997 | Trauben ............................. | 395/183.15 |

OTHER PUBLICATIONS

Intel, *Pentium Pro Family Developer's Manual Volume 3: Operating System Writer's Guide*, Dec. 1995, pp. viii, 10–1 to 10–19, and B–1 to B–6.
TI, *TMS32010 User's Guide*1983, pp. 3–7.
IBM Technical Disclosure Bulletin, *Error Tracing Arrangement of a Pipelined Processor*, vol. 28, No. 2, Jul. 1985, pp. 621–624.

*Primary Examiner*—Richard L. Ellis
*Attorney, Agent, or Firm*—Blakely, Sokoloff, Taylor & Zafman LLP

[57] ABSTRACT

The present invention discloses a method and system for observing and measuring in real-time an event inside a processor via an observation architecture (OA). The method comprises the steps of: (1) receiving a command instruction; the command instruction includes at least an opcode and an operand specifier; (2) decoding the command instruction by converting the opcode into control bits; (3) mapping the operand specifier to select at least one resource element of the observation architecture; and (4) capturing the event according to the control bits.

23 Claims, 8 Drawing Sheets

6,023,759

SYSTEM FOR OBSERVING INTERNAL PROCESSOR EVENTS UTILIZING A PIPELINE DATA PATH TO PIPELINE INTERNALLY GENERATED SIGNALS REPRESENTATIVE OF THE EVENT

BACKGROUND OF THE INVENTION

1. Field of the Invention

This invention relates to observation architecture. In particular, the invention relates to a command interface and instruction set for real-time observation of the internal events of a graphics controller.

2. Description of Related Art

Real-time observation of internal events within a co-processor is a useful technique to provide feedback on the efficacy of both hardware and software of the overall system. Typically, a co-processor operates under the control of a host processor. The host processor normally initializes the co-processor and sends command instructions to allow the co-processor to perform its operations. During the operations, it is useful for the host processor to be able to observe the internal events of the co-processor. Such an observation of real-time events provides useful information. For example, the host can measure the co-processor's performance.

To provide the host processor with the ability to observe the internal events and measure the co-processor's performance, it is necessary to develop an interface architecture that allows the host processor to communicate with the co-processor without disturbing the co-processor's activities. Such an interface architecture usually involves the use of hardware resources inside the co-processor and the mapping of these resources into a universal instruction set.

Due to the complexity of such a co-processor, the number of resources that are set up for observation may be quite significant. The allocation of the resources needed for observation is a challenging problem. Prior techniques do not provide complete and consistent information of the performance data. These techniques do not provide optimal utilization of hardware and software, and therefore, usually result in a less than optimal architecture.

An observation architecture does not merely provide the hardware resources. It also provides a useful software interface to allow the host processor to perform such observation and measurement activities in the most efficient manner. Prior techniques such as boundary scanning merely provide a hardware mechanism to report internal status information at predefined locations. Other techniques may provide a status inquiry facility in terms of a status register so that the host processor can interrogate when necessary. However, the observation through status inquiry is not real-time and does not provide flexibility in utilizing the hardware resources.

Therefore, there is a need in the technology to provide an optimal instruction set for real-time observations and measurements that can be easily invoked through the command interface with low hardware and software overhead.

SUMMARY OF THE INVENTION

The present invention discloses a method and system for observing and measuring in real-time an event inside a processor via an observation architecture (OA). The method comprises the steps of: (1) receiving a command instruction; the command instruction includes at least an opcode and an operand specifier; (2) decoding the command instruction by converting the opcode into control bits; (3) mapping the operand specifier to select at least one resource element of the observation architecture; and (4) capturing the event according to the control bits.

BRIEF DESCRIPTION OF THE DRAWINGS

The features and advantages of the present invention will become apparent from the following detailed description of the present invention in which.

DESCRIPTION OF THE PRESENT INVENTION

The present invention discloses a method and system to allow a host processor to observe and measure events captured inside a co-processor. An instruction set provides a number of instructions which are encoded to provide direct access to the internal resources. These instructions are mapped to various parts of the observation architecture to allow the host processor to observe and measure real-time events inside the co-processor without disturbing the co-processor's activities.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
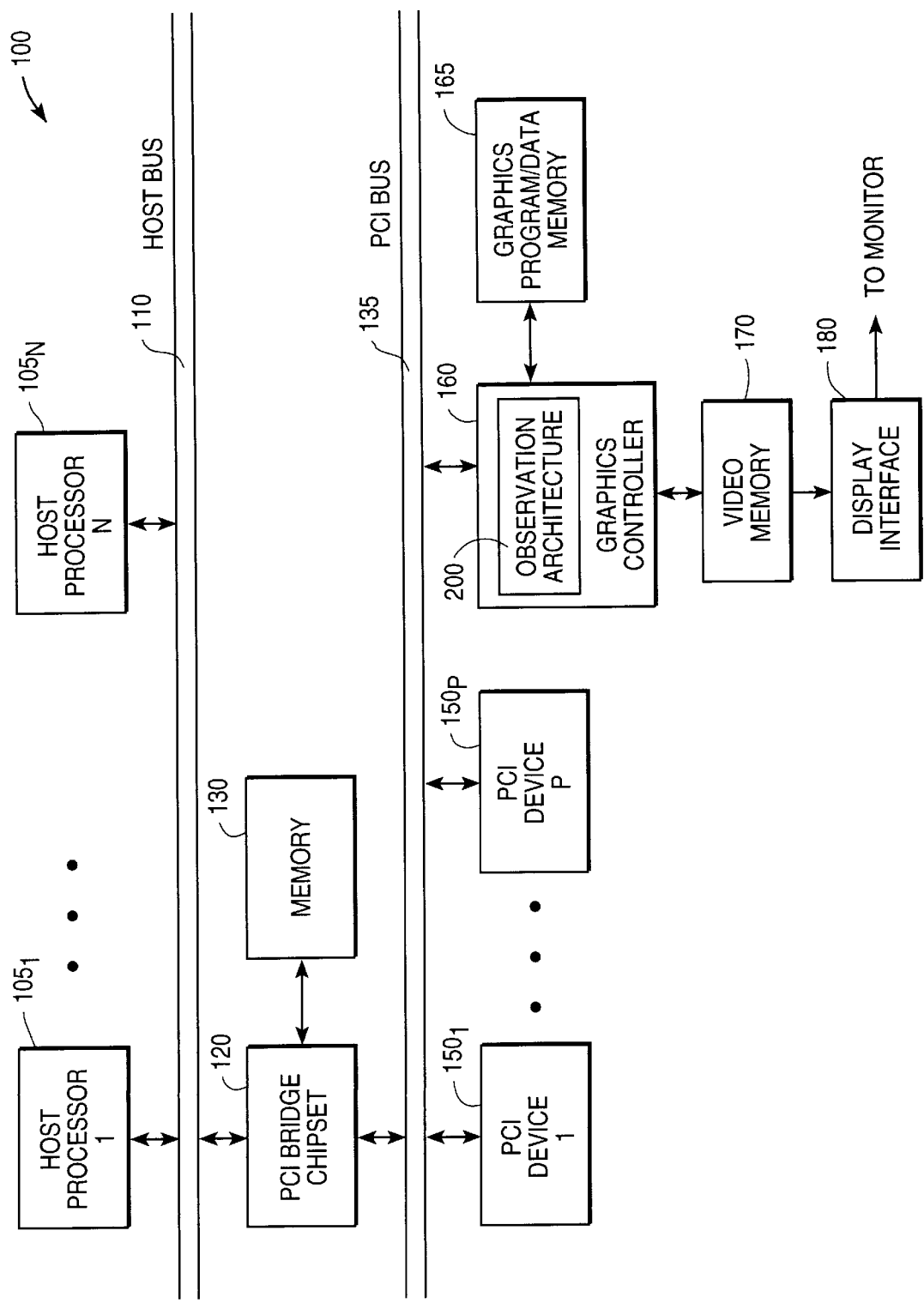
FIG. 1 is a block diagram illustrating one embodiment of a system in accordance with the teachings of the present invention.

Referring to FIG. 1, an illustrative embodiment of a computer system utilizing the present invention is shown. The computer system 100 comprises one or more processors $105_1$–$105_N$ ("N" being a positive whole number) and a main memory 130 (e.g., dynamic random access memory "DRAM", static random access memory "SRAM", etc.) coupled together by a chipset 120. In general, the chipset 120 operates as an interface between a host bus 110 and a peripheral bus 135.

Processors $105_1$–$105_N$ are any microprocessors. In this embodiment, processors $105_1$–$105_N$ are the Pentium® or Pentium Pro™ microprocessors manufactured by Intel Corporation of Santa Clara, Calif.

Chipset 120 typically includes cache DRAM controller (CDC), peripheral bus controller, and data path unit (DPU). The Peripheral Component Interconnect (PCI) Bridge provides a set of host-to-PCI and PCI-to-host bus transaction translations.

The host bus 110 is a bus that can support transactions to a number of connected processors. Host bus 110 may be referred to as a parallel bus or multiprocessor bus because it supports parallel operations and multiple processors. It is contemplated that host bus 110 operates in a pipelined manner to increase efficiency. However, these features should not be construed to limit the teachings of the present invention. The present invention can be utilized if there is only one processor connected to the host bus 110, or when the host bus 110 does not support parallel operations.

The peripheral bus 135 provides a communication path between the processors $105_1$–$105_N$ or main memory element 130 and a plurality of peripheral devices $150_1$–$105_P$ ("P" being a positive whole number). The peripheral bus 135 may include a Peripheral Component Interconnect (PCI) bus or any other type of bus architecture. These peripheral devices $150_1$–$150_P$ may include I/O devices such as disk controller, Local Area Network (LAN) controller.

In particular, a graphics controller 160 is one of such peripheral devices. The graphics controller 160 is the co-processor whose internal events are observed and measured by the host processor. As is known by one skilled in the art, the present invention can be practiced with any other processors. Examples of such processors are digital signal processors, disk controllers, network processors, or microprocessors. The use of the graphics processor is merely to illustrate one embodiment. In one embodiment, the graphics controller 160 has interface to a graphics program and data memory 165, a video memory 170, and a display interface 180.

The graphics controller 160 has an internal observation architecture (OA) 200 which provides the hardware and software resources to allow the host processor (e.g., any one of the processors $105_1$ through $105_N$) to observe the internal events and measure the performance of the graphics controller 160. The OA 200 will be described later.

The graphics program and data memory 165 contains the program instructions that are executed by the graphics controller 160 and data used by the graphics controller 160. The video memory 170 contains display data. These data may include individual pixels of the graphics structure. The display interface 180 includes interface circuits such as digital-to-analog converter, video signal generator to produce appropriate video signal to the display monitor.

Figure 2:
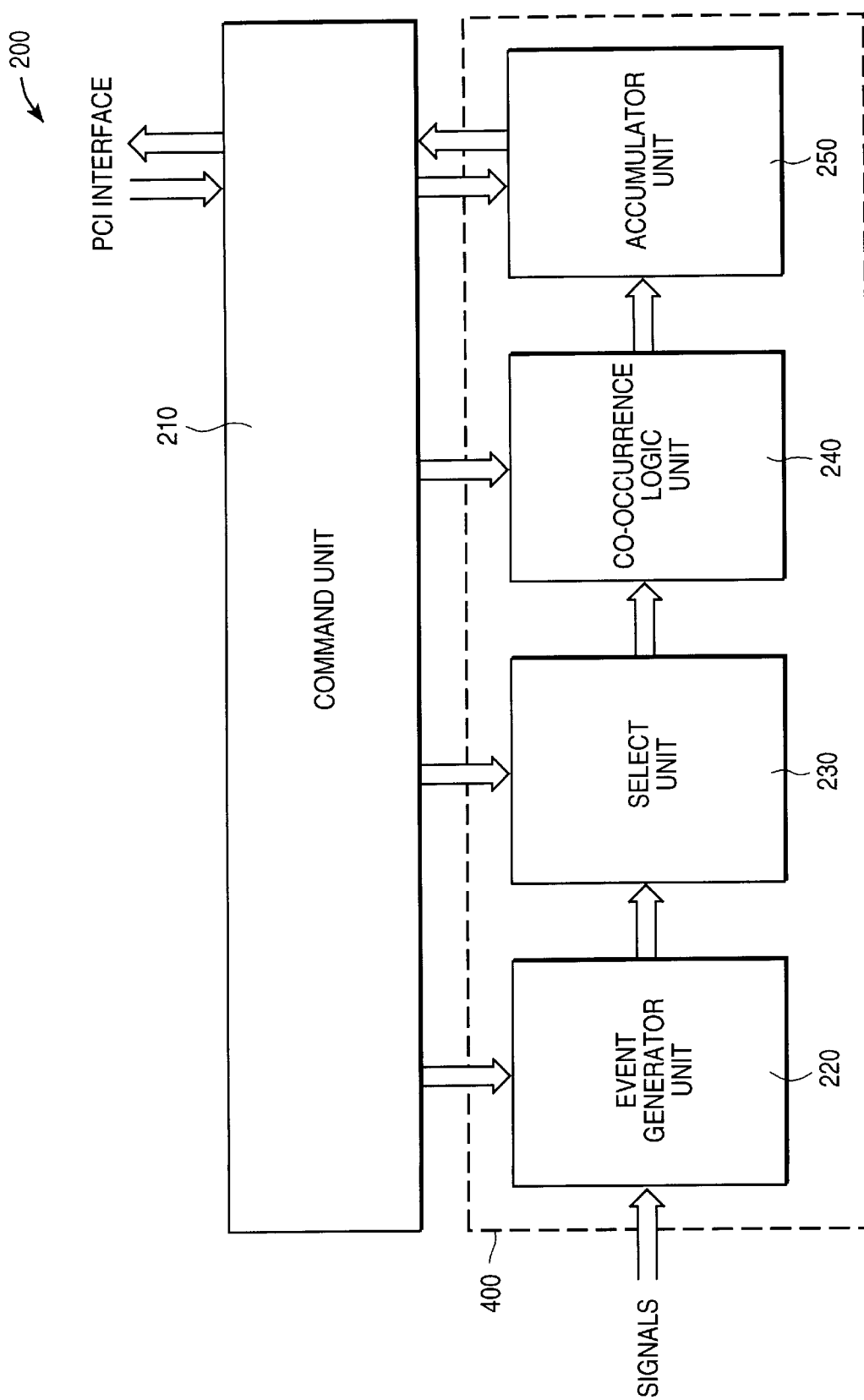
FIG. 2 is a diagram illustrating one embodiment of an observation architecture.

Referring to FIG. 2, a diagram illustrating one embodiment of the observation architecture 200 in accordance with the teachings of the present invention is shown. The observation architecture (OA) 200 includes a command unit (CU) 210, and a pipeline datapath 400. The pipeline datapath 400 includes an event generator unit (EGU) 220, a select unit (SU) 230, a co-occurrence logic unit (CLU) 240, and an accumulator unit (ACU) 250.

CU 210 is interfaced with the PCI bus to receive address information and command instructions from the host processor, and sending data back to the host processor via the PCI bus. In response to the command instructions, CU 210 generates control signals to EGU 220, SU 230, CLU 240, and ACU 250, and obtains data from ACU 250.

EGU 220 receives the signals internally generated by the observed processor (e.g., the graphics controller 160). These signals are normally encoded according to the functionality of the observed processor. The EGU 220 decodes these encoded signals into individual observable events. The events are captured by EGU 220 in real time while the events are taking place. Examples of these events include memory read transactions and memory write transactions.

SU 230 selects the decoded events as generated by EGU 220 according to the control signals from CU 210.

CLU 240 performs combinational logic operations on the selected events from SU 230.

ACU 250 accumulates the occurrences of the combined selected events and produces the desired results to be read by CU 210.

The command unit 210 and the pipeline datapath 400 have a logical interface architecture that establishes several interfaces to various components of the observation architecture.

Figure 3:
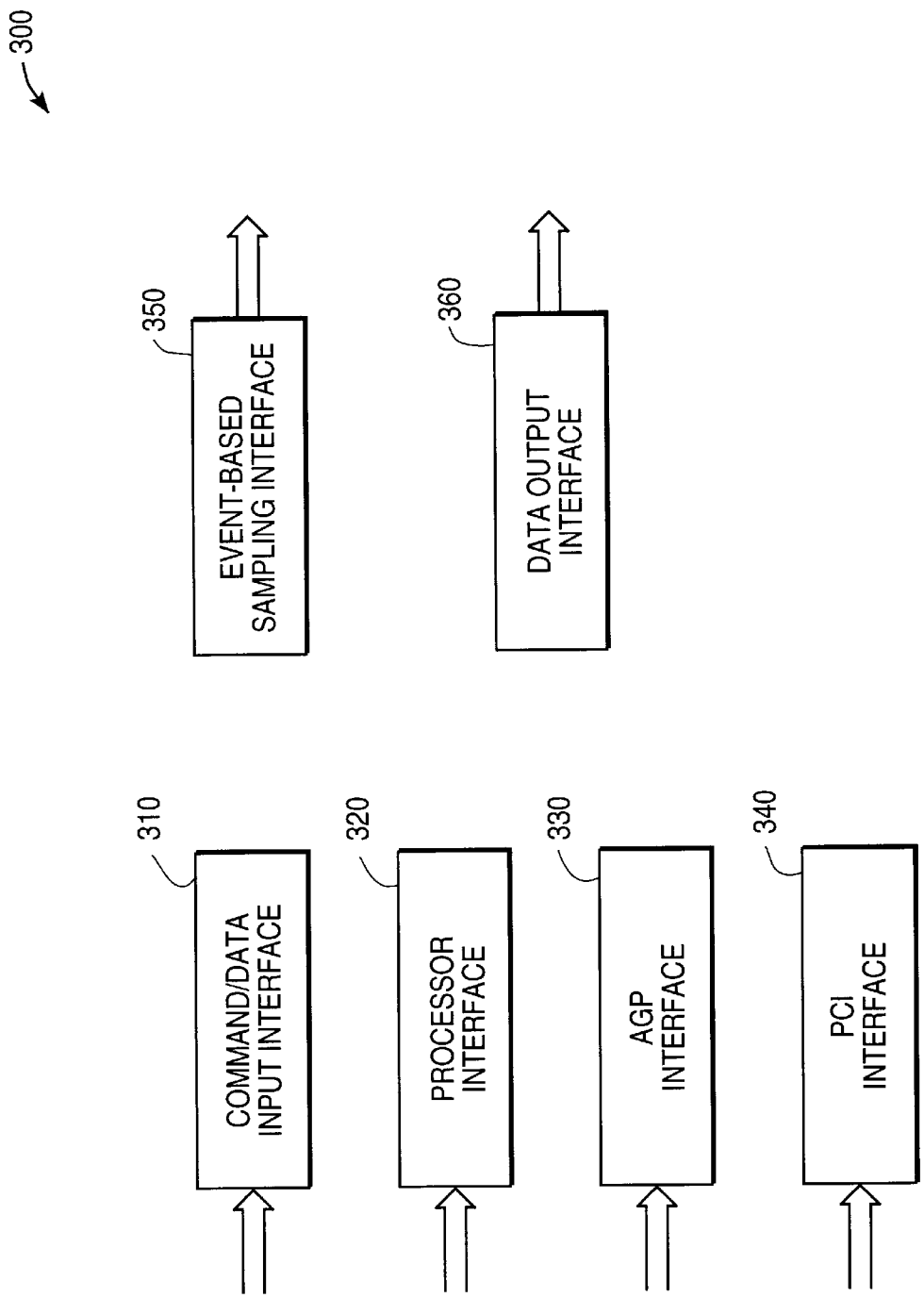
FIG. 3 is a diagram illustrating one embodiment of the interfaces of the observation architecture.

Referring to FIG. 3, a diagram illustrating one embodiment of the interface architecture (IA) 300 is shown. The IA 300 includes a command/data input interface 310, a processor interface 320, an accelerated graphics port (AGP) interface 330, a PCI interface 340, an event-based sampling interface 350, and a data output interface 360.

The command/data input interface 310 provides the address decoding logic for the communication between the host processor (one of the processors $105_1$ through $105_N$) and the OA 200 of FIG. 2. The processor interface 320 provides the actual interface between the core logic and the OA 200. The AGP interface 330 provides the interface to the internal bus of the accelerated graphics port. The PCI interface 340 provides the interface to the PCI bus. The event-based sampling interface 350 generates sampling signals such as interrupts to the host processor. The data output interface 360 provides the output data as generated by the OA 200 to the host processor.

Figure 4:
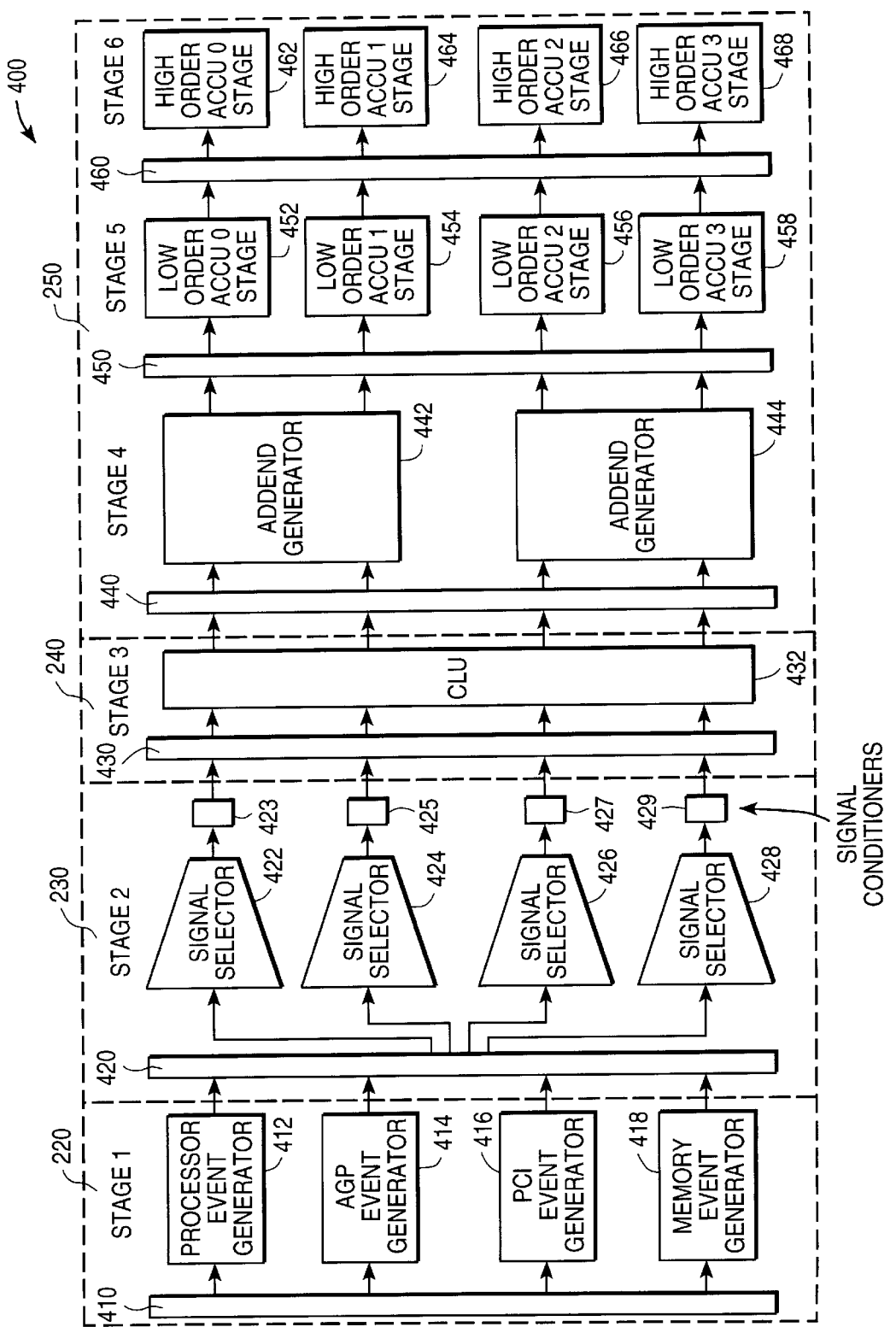
FIG. 4 is a diagram illustrating one embodiment of a pipeline datapath.

Referring to FIG. 4, a diagram illustrating the datapath 400 of the OA 200 is shown. The datapath 400 includes six pipelined stages latched by six pipeline registers 410, 420, 430, 440, 450, and 460 corresponding to stages 1, 2, 3, 4, 5, and 6, respectively.

Stage 1 is the event generator stage performed by EGU 220. EGU 220 includes the processor event generator 412, the AGP event generator 414, the PCI event generator 416, and the memory event generator 418. The processor event generator 412 generates events related to the observed processor. The AGP event generator 414 generates events related to the AGP. The PCI event generator 416 generates events related to the PCI bus transactions. The memory event generator 418 generates events related to the memory transactions.

Stage 2 is the selecting stage performed by SU 230. SU 230 includes 4 signal selectors 422, 424, 426, and 428. Any of the signal selectors can select any of the events generated by any of the processor event generator 412, the AGP event generator 414, the PCI event generator 416, and the memory event generator 418. Each of these selectors is a K-to-1 multiplexer. The multiplexer outputs of selectors 422, 424, 426, and 428 are connected to the signal conditioners 423, 425, 427, and 429, respectively. The signal conditioners 423, 425, 427, and 429 modify the selected event signals according to the desired command.

Stage 3 is the co-occurrence logic stage performed by CLU 240. CLU 240 can perform a number of Boolean operations. For two events A and B, CLU 240 provides Boolean operations on A and B to produce the result Y. Examples of these Boolean operations are:

| | |
|---|---|
| Y = A | Y = B |
| Y = A and B | Y = A nand B |
| Y = A or B | Y = A nor B |
| Y = A xor B | Y = A xnor B |

The CLU 240 also performs multiple inputs operations such as Y=A op B op C op D, where "op" refers to any of the available Boolean operations.

Stages 4, 5, and 6 is the accumulating stage performed by ACU 250. Stage 4 is the addend generator stage which includes a first addend generator 442 and a second addend generator 444. The first and second addend generators 442 and 444 produce the addends required for the accumulation. Stage 5 includes the low order accumulating stages 452, 454, 456, and 458 which correspond to the low order of the 4 accumulators 0, 1, 2, and 3. Stage 6 includes the high order accumulating stages 462, 464, 466, and 468 which correspond to the high order of the 4 accumulators 0, 1, 2, and 3.

The accumulating stage accumulates the occurrences of the events to provide the measurement. The addend used for the accumulation comes from two sources: an internal addend generator and EGU 220. The internal addend generator provides the number of outstanding requests for measuring latency or queue depth. In one embodiment, the number of outstanding requests is kept tracked by an up/down counter which increments (up counting) or decrements (down counting). The up/down counter increments when there is an arrival of a transaction and decrements when there is a completion of a transaction. For instructions that do not involve the outstanding requests, EGU 220 provides the appropriate addend based on the type of the transaction. For example, in the processor-to-memory-read transaction, the size of the operand in the transaction is decoded by EGU 220 to provide the proper addend value.

The OA 200 is interfaced to the host processor via a host input/output interface. The host input/output interface allows the host processor to issue command instructions and data to the OA and read data representative of the events from the OA.

Figure 5:
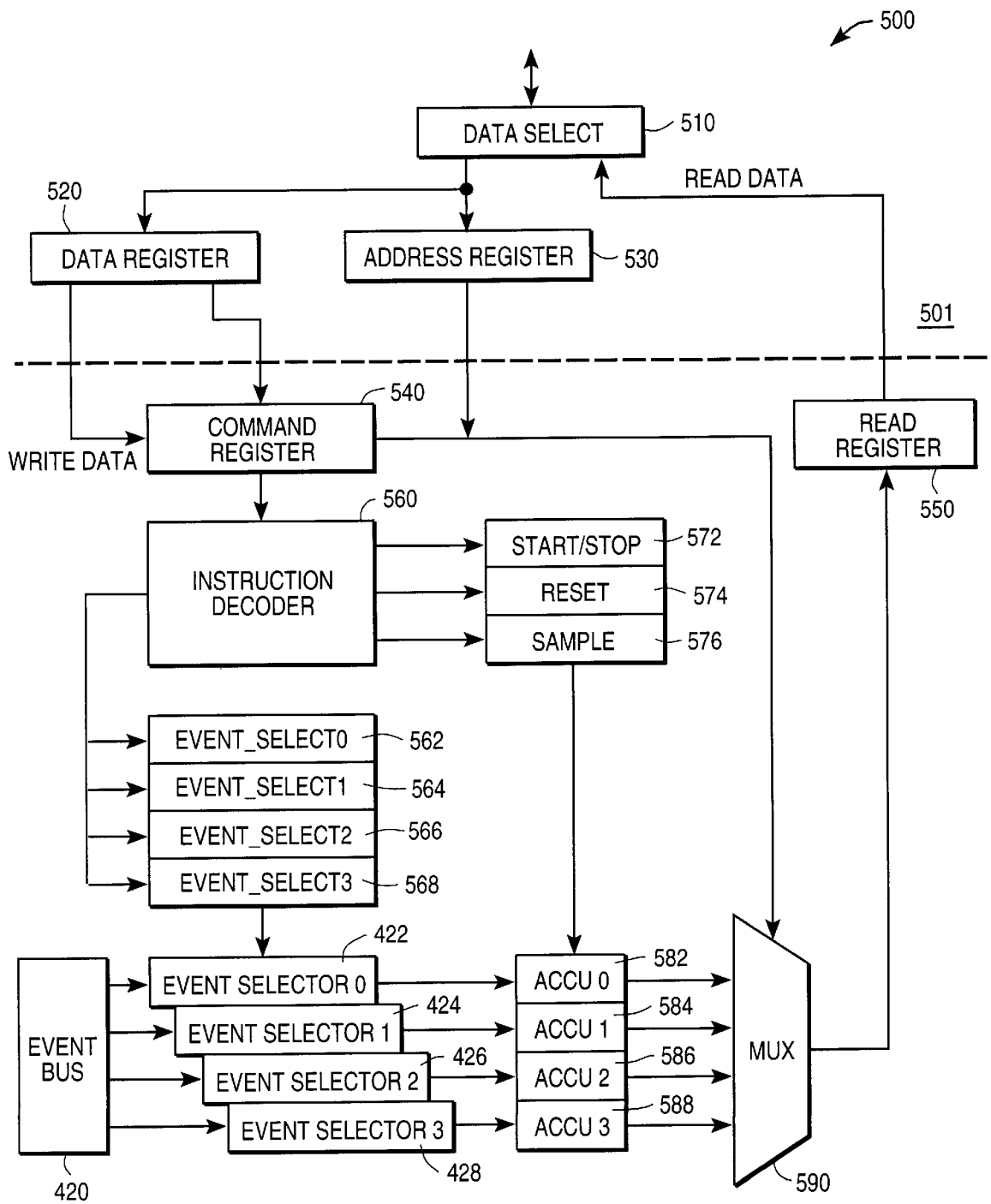
FIG. 5 is a diagram illustrating one embodiment of a command interface.

Referring to FIG. 5, a diagram illustrating one embodiment of the host input/output interface 500 is shown. The host input/output interface 500 includes the host section 501 and the counter unit section 502.

The host section 501 includes a data select 510, a data register 520, and an address register 530. The data select 510 selects the data flow to and from the counter unit section 502. The data select 510 is essentially a bidirectional buffer/register to allow to host processor to write to and read from the OA 200. The data register 520 stores the data written by the host processor. The address register 530 stores the address issued by the host processor. The address issued by the host processor specifies the destination of the data as stored in the data register 520. This destination can be either the instruction to the OA 200, or the data which is preloaded to the specified accumulator.

The counter unit section 502 includes a command register 540, a read register 550, an instruction decoder 560, a start/stop register 572, a reset register 574, a sample register 576, four event select registers 562, 564, 566, and 568, four accumulators (accu0, accu1, accu2, and accu3) 582, 584, 586, and 588, and an accumulator multiplexer (ACMUX) 590.

The command register 540 stores the command instruction when the address in the address register 530 corresponds to the instruction decoder 560. The read register 550 stores the value in the accumulators as selected by the ACMUX 590. This value is read by the host processor. The instruction decoder 560 decodes the command instruction stored in the command register 540 to produce appropriate control bit patterns. The start/stop register 572 stores the control bit pattern to enable (start) or inhibit (stop) the specified accumulator(s). The reset register 574 stores the bit pattern to clear the specified accumulator(s). The sample register 576 stores the control bit pattern that samples (copies) the specified accumulator(s).

The four event select registers 562, 564, 566, and 568 hold the control bit patterns to control the corresponding signal selectors 422, 424, 426, and 428. The accumulators 582, 584, 586, and 588 store the accumulated values corresponding to the specified signal selectors.

The accumulator multiplexer 590 selects the accumulator as specified by the command instruction to output the selected accumulator value to the read register 550.

The command instruction issued by the host processor has two parts: the opcode and the operand specifier. The format of the instructions will be described later. The opcode field is decoded by the instruction decoder 560 as explained above. The operand specifier field is mapped to the various parts of the OA 200 to select the resource elements. One mapping is explained in the following.

Figure 6:
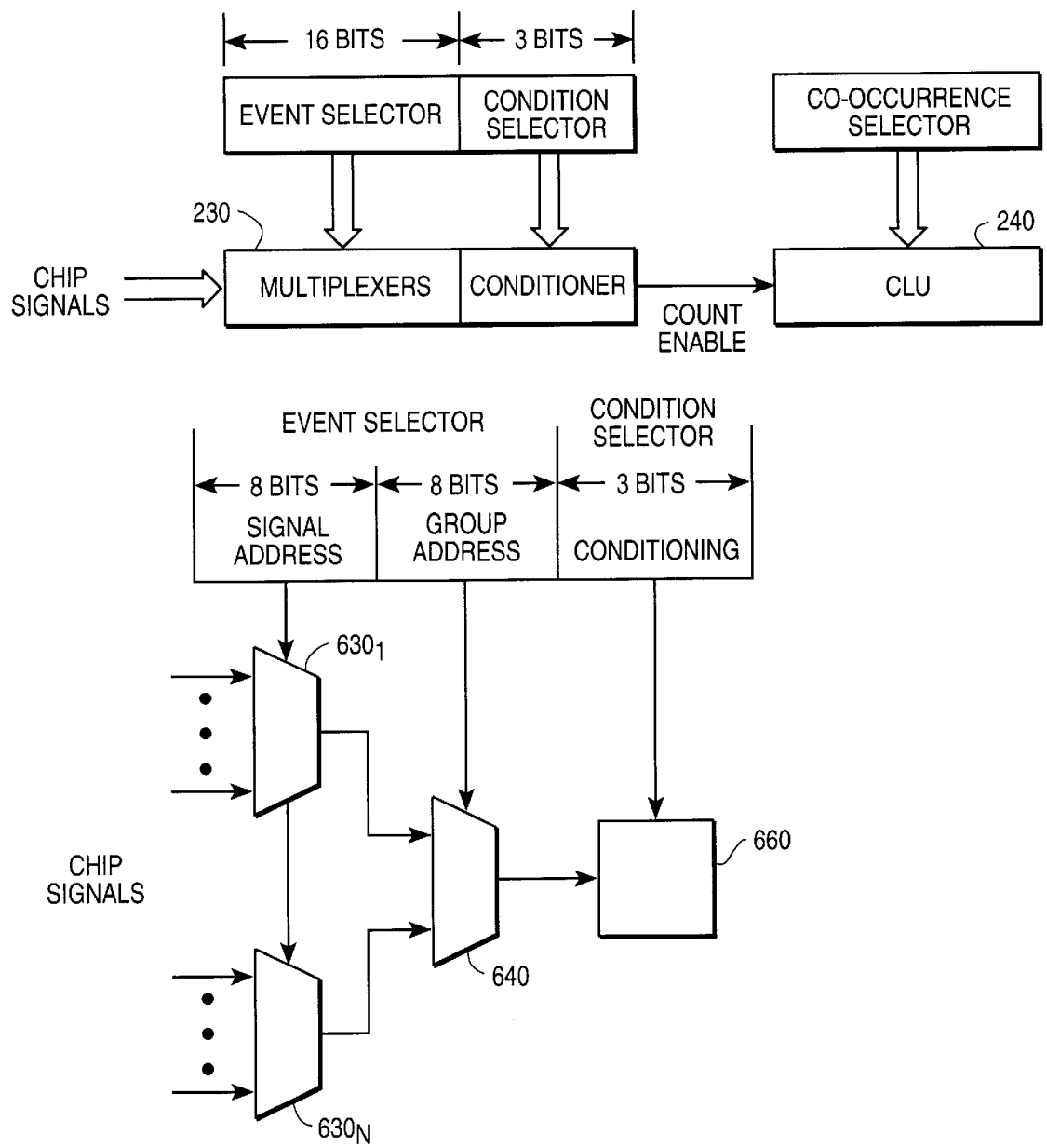
FIG. 6 is a diagram illustrating one embodiment of a mapping of the operand specifier to the selector unit.

Referring to FIG. 6, a diagram illustrating a mapping of the command instruction to SU 230 is shown. SU 230 includes the signal multiplexers $630_1$ through $630_L$ ("L" being a whole positive number), the group multiplexer 640 and the signal conditioner 660. The signal conditioner 660 is one of signal conditioners 423, 425, 427, and 429 shown in FIG. 4.

The multiplexers $630_1$–$630_L$ selects the event signals from EGU 220. In one embodiment, L is equal to 256. Each of the 256 multiplexers $630_1$–$630_{256}$ selects one of the 256 event signals. The group multiplexer is a 256-to-1 multiplexer selects one of the 256 signal events. The final selected event goes through the signal conditioner 660.

The signal conditioner 660 modifies the selected event. In one embodiment, the signal conditioner performs five operations: no-operation (i.e., event signal is passed unmodified), inverted (i.e., event signal is complemented), signal shot positive logic (i.e., high level event signal is converted to a pulse ), single shot negative logic (i.e., low level event signal is converted to a pulse), and transition counting (i.e., counting the number of signal transitions from low-to-high and from high-to-low).

Figure 7A:
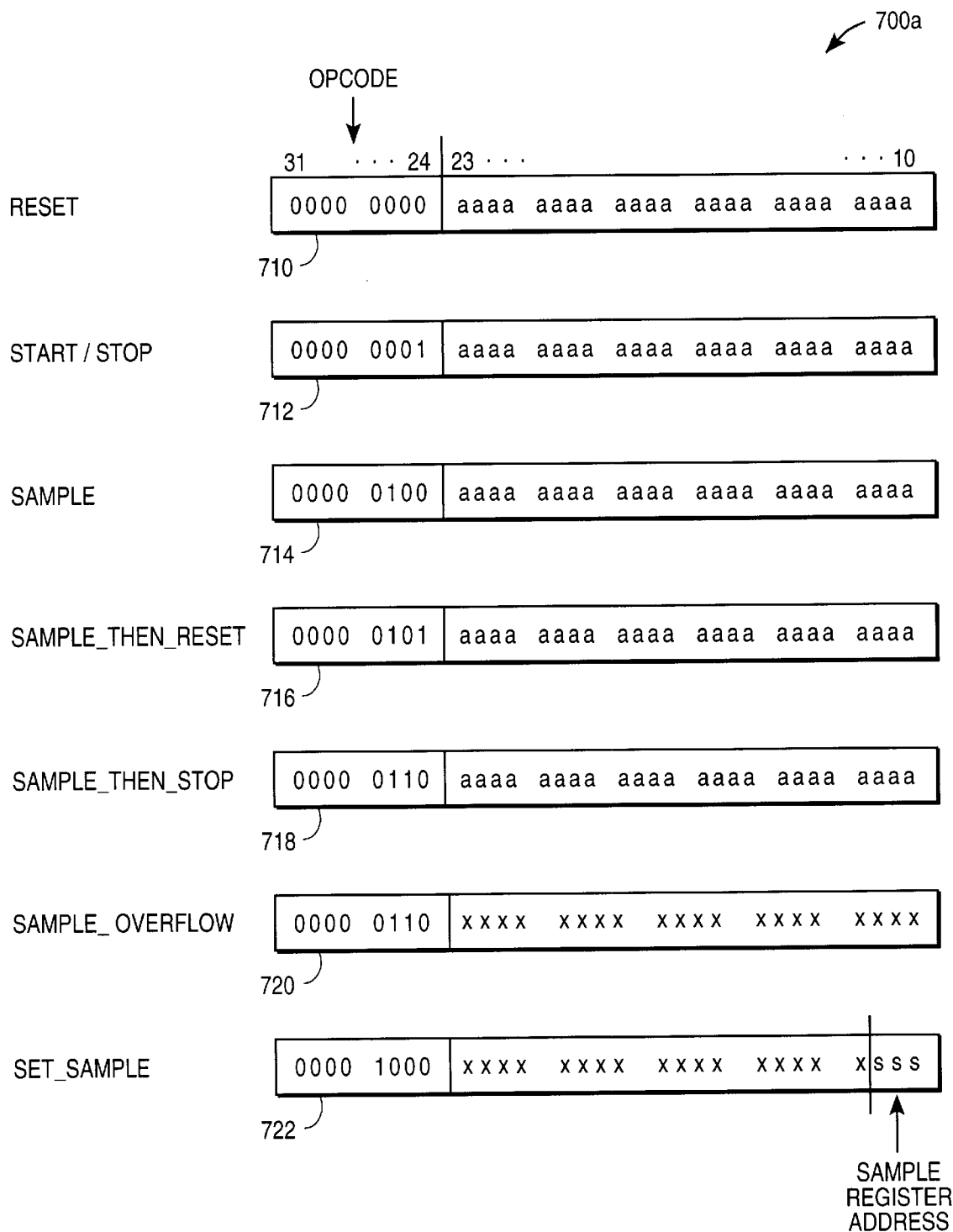
FIG. 7(A) is a diagram illustrating one embodiment of the encodings of the accumulation instructions.

Referring to FIG. 7A, a diagram illustrating the encodings of the accumulation instructions 700A are shown. The accumulation instructions 700A includes a RESET instruction 710, a START/STOP instruction 712, a SAMPLE instruction 714, a SAMPLE_THEN_RESET instruction 716, a SAMPLE_THEN_STOP instruction 718, a SAMPLE_OVERFLOW instruction 720, and a SET_SAMPLE instruction 722.

Figure 7B:
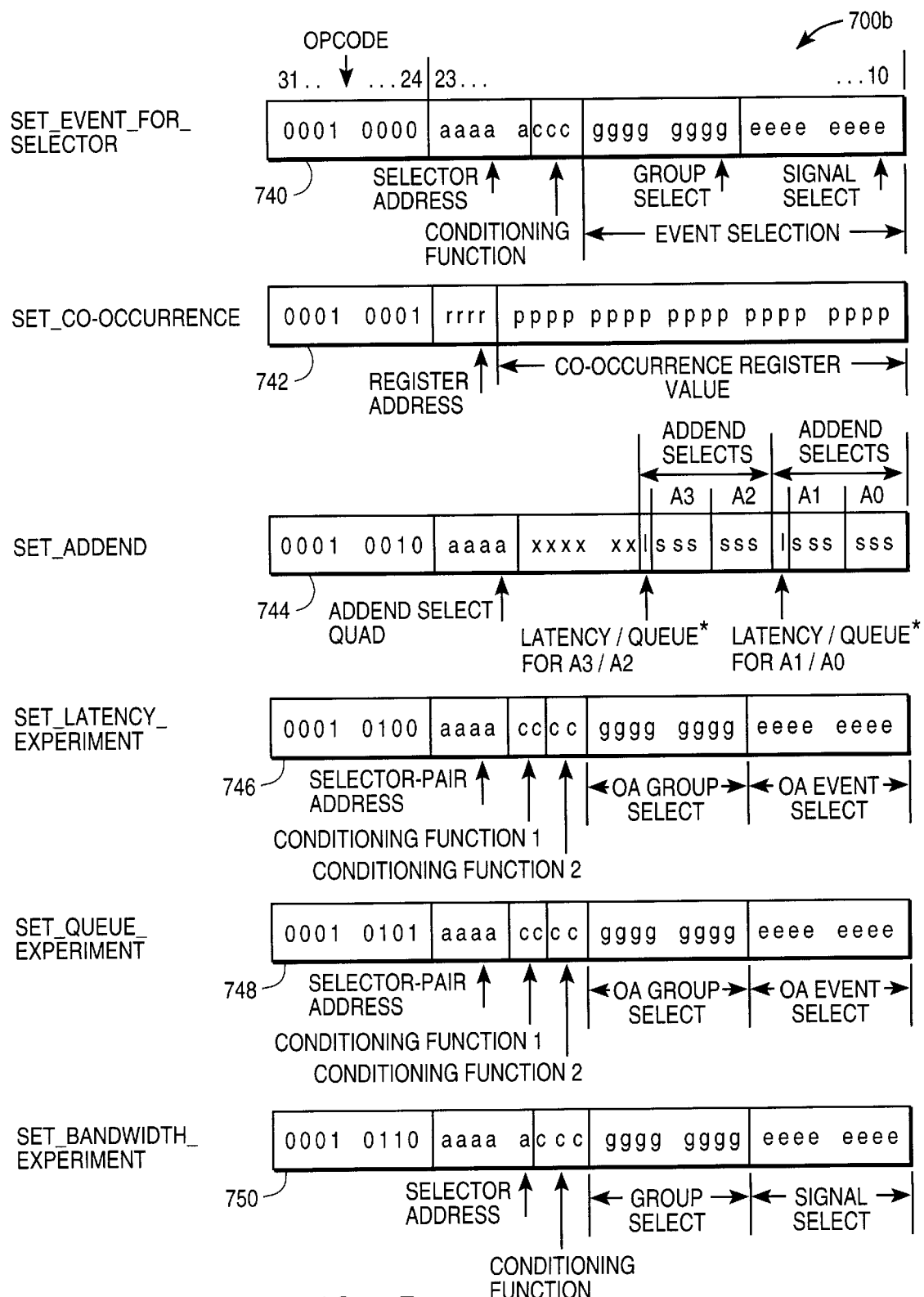
FIG. 7(B) is a diagram illustrating one embodiment of the encodings of the event instructions.

All instructions are encoded with 32 bits. The most significant 8 bits (bits 24 through 31) correspond to the operation code (opcode) that specifies the unique operation. Other opcode widths are acceptable as long as the number of bits represent the total number of instructions. The opcodes shown in FIGS. 7A and 7B are for illustrative purpose. Any opcode encodings having unique representation are acceptable.

The RESET, START/STOP, SAMPLE, SAMPLE_THEN_RESET, SAMPLE_THEN_STOP instructions 710, 712, 714, 716, and 718 have similar encodings. The opcode specifies the operation to be performed on the accumulator(s) as selected by bits 0 through 23. Bits 0 through 23 ("aaaa . . . aaaa") represent the bit pattern to select the accumulators. A logical zero corresponds to a non-selected accumulator, a logical one corresponds to a selected accumulator. In one embodiment, there are 4 accumulators. Therefore, 4 bits are used: bits 0 through 3 correspond to accumulators 0 through 3, respectively. For example, an encoding of "aaaa"=1001 means that accumulators 0 and 3 are selected and accumulators 1 and 2 are not selected.

The RESET instruction 710 has an opcode 0x00. The RESET instruction clears (to zero) the selected accumulator (s). This instruction is useful to initialize the selected accumulator(s).

The START/STOP instruction 712 has an opcode of 0x01. The START/STOP instruction enables or inhibits the accumulating task of the selected accumulator(s). In one embodiment, a logical 1 indicates that the selected accumulator is enabled to start accumulating, a logical 0 indicates that the selected accumulator is inhibited from accumulating. For example, an encoding of "aaaa"=0100 means that accumulators 0, 1, and 3 are stopped and accumulator 2 is started.

The SAMPLE instruction 714 has an opcode of 0x04. The SAMPLE instruction copies the selected accumulator(s) to a shadow register file which can be read by the host. This instruction is useful to take a snapshot of the selected accumulators at a particular time instant without disrupting the accumulation.

The SAMPLE_THEN_RESET instruction 716 has an opcode 0x05. The SAMPLE_THEN_RESET instruction copies the contents of the selected accumulator(s) and then clears the selected accumulator(s). This instruction obtains the value(s) of the selected accumulator(s) and then initializes the selected accumulator(s) to be ready for the next operation.

The SAMPLE_THEN_STOP instruction 718 has an opcode 0x06. The SAMPLE_THEN_STOP instruction copies the contents of the selected accumulator(s) and then inhibits the selected accumulator(s). This instruction obtains the value(s) of the selected accumulator(s) and then stops the operation of the selected accumulator(s).

The SAMPLE_OVERFLOW instruction 720 has an opcode 0x07. Bits 0 through 23 are DON'T CARES because this instruction has implicit operands. The SAMPLE_OVERFLOW instruction copies the overflow register to another register which will be read by the host processor. The overflow register stores the overflow bits for all the accumulators, one bit for each accumulator. This instruction is useful to keep track of the number of times the accumulators exceed their maximum values.

The SET_SAMPLE instruction 722 has an opcode 0x08. Bits 0 through 2 encode the address of the register to be read out of the read register 550 shown in FIG. 5. In one embodiment, there are 5 registers: 4 accumulators and the overflow register. Bits 3 through 23 are DON'T CARES. This instruction is used when the host is ready to read the accumulators or the overflow register.

Referring to FIG. 7B, a diagram illustrating the encodings of the accumulation instructions 700B are shown. The accumulation instructions 700B includes a SET_EVENT_FOR_SELECTOR instruction 740, a SET_CO_OCCURRENCE instruction 742, a SET_ADDEND instruction 744, a SET_LATENCY_EXPERIMENT instruction 746, a SET_QUEUE_EXPERIMENT instruction 748, and a SET_BANDWIDTH_EXPERIMENT instruction 750.

The SET_EVENT_FOR_SELECTOR instruction 740 has an opcode 0x10. Bits 0 through 15 encode the event selection: bits 0 through 7 encode the signal selection and bits 8 through 15 encode the group selection. Bits 0 through 15 are mapped to the SU 230 as shown in FIG. 6. Bits 16–18 encode the conditioning functions performed by the signal conditioner. Bits 19 through 23 encode the selector address in the SU 230. In one embodiment, there are 4 selectors; therefore bits 19 and 20 are used to address the 4 selectors. This instruction select the event, the selector, and the conditioning function. It is essentially used to set up stages 1 and 2 in the pipeline data path shown in FIG. 4.

The SET_CO_OCCURRENCE instruction 742 has an opcode 0x11. Bits 0 through 19 provide the co-occurrence register value used in the co-occurrence logic unit (CLU). Bits 20 through 23 encode the register address in the CLU. This instruction sets up stage 3 in the pipeline data path shown in FIG. 4.

The SET_ADDEND instruction 744 has an opcode 0x12. Bits 0 through 6 encode the addend pair 0, bits 7 through 13 encode the addend pair 1. Bits 0–2 select the addend for accumulator 0, bits 3–5 select the addend for accumulator 1. Bit 6 selects latency or queue for the accumulator pair 0 (i.e., accumulator 0 and accumulator 1): a logical 1 selects latency and a logical 0 selects queue. Bits 7–9 select addend for accumulator 2. Bits 10–12 select addend for accumulator 3. Bit 13 selects latency or queue for the accumulator pair 1 (i.e., accumulator 2 and accumulator 3): a logical 1 selects latency and a logical 0 selects queue. Bits 14 through 19 are DON'T CARES. Bits 20 through 23 encode the addend select quad. For example "aaaa"=0000 selects accumulator quad 0 which includes accumulators 0, 1, 2, and 3; "aaaa"= 0001 selects accumulator quad 1 which includes accumulators 4, 5, 6, and 7, etc. This instruction can specify 16×4=64 accumulators.

Depending on the instruction, the addends for the accumulators come from one of two sources: an internal addend generator and the event generator unit 220. For instructions that involve the measurement of outstanding requests (e.g., SET_LATENCY_EXPERIMENT), the internal addend generator is the source to provide the number of outstanding requests. For other instructions, the EGU 220 is the source.

The SET_LATENCY_EXPERIMENT instruction 746 has an opcode 0x14. Bits 0 through 15 encode the operational analysis (OA) event selection: bits 0 through 7 encode the signal selection and bits 8 through 15 encode the group selection. Bits 0 through 15 are mapped to the SU 230 as shown in FIG. 6. Bits 16–17 encode the conditioning function 2 Bits 18–19 encode the conditioning function 1. Bits 20 through 23 encode the selector-pair address.

Latency of a transaction is given by the difference in time between the beginning and the end of the transaction. When there are multiple outstanding transactions, the latency L is evaluated by the expression L=B/C where B is the time integrated value of the number of outstanding requests per clock and C is the number of completions. B can be measured by accumulating the number of outstanding requests on a per clock basis.

The SET_LATENCY_EXPERIMENT instruction measures the average latency L as given above. The average latency L is useful in determining the amount of buffering. The higher the latency value, the more buffering is needed.

The SET_QUEUE_EXPERIMENT instruction 748 has an opcode 0x15. Bits 0 through 15 encode the operational analysis (OA) event selection: bits 0 through 7 encode the signal selection and bits 8 through 15 encode the group selection. Bits 0 through 15 are mapped to the SU 230 as shown in FIG. 6. Bits 16–17 encode the conditioning function 2. Bits 18–19 encode the conditioning function 1. Bits 20 through 23 encode the selector-pair address.

The average queue depth Q is measured by the equation Q=D/A where D represents the new arrival accumulation of the number of outstanding requests and A represents the accumulated transaction arrivals.

The SET_QUEUE_EXPERIMENT instruction measures the average queue depth Q as given above. The average queue depth Q is useful in determining the efficacy of transaction processing.

The SET_BANDWIDTH_EXPERIMENT instruction 750 has an opcode 0x16. Bits 0 through 15 encode the event selection: bits 0 through 7 encode the signal selection and bits 8 through 15 encode the group selection. Bits 0 through 15 are mapped to the SU 230 as shown in FIG. 6. Bits 16–18 encode the conditioning functions performed by the signal conditioner. Bits 19 through 23 encode the selector address in the SU 230. In one embodiment, there are 4 selectors; therefore bits 19 and 20 are used to address the 4 selectors. This instruction selects the event, the selector, and the conditioning function. It measures the bandwidth by accumulating the number of bytes transferred at the specified bus.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for observing and measuring in real-time an event inside a device, the method comprising:

generating control bits from a command instruction by a command unit, the command instruction being issued by a host processor external to the device, the command instruction including at least an opcode and an operand specifier; and pipelining internally generated signals through a pipeline datapath to produce a measurement of the event based on the control bits, the internally generated signals being representative of the event.

2. The method of claim 1 wherein generating the control bits comprises:

receiving the command instruction from the host processor via a command interface; and decoding the command instruction by converting the opcode into the control bits.

3. The method of claim 2 wherein pipelining comprises:

encoding the signals to represent the event by an event generator unit;

selecting the encoded signals by a selector unit;

performing logic functions on the selected signals by a co-occurrence logic unit; and accumulating occurrences of the event represented by the performed signals by an accumulator unit, the accumulated occurrences of the event providing the measurement.

4. The method of claim 1 wherein selecting the encoded signals comprises:

mapping the operand specifier to select at least one resource element, the at least one resource element being an accumulator in the accumulator unit; and capturing the encoded signals according to the control bits.

5. The method of claim 4 wherein the command instruction is a reset instruction which clears the accumulator.

6. The method of claim 4 wherein the command instruction is a start/stop instruction which enables/inhibits the accumulator.

7. The method of claim 4 wherein the command instruction is a sample instruction which copies the accumulator to a read register.

8. The method of claim 4 wherein the command instruction is a sample-then-reset instruction which copies the accumulator to a read register and then clears the accumulator.

9. The method of claim 4 wherein the command instruction is a sample-then-stop instruction which copies the accumulator to a read register and then inhibiting the accumulator.

10. The method of claim 1 wherein the at least one resource element is an overflow register which records an overflow condition of a corresponding accumulator.

11. The method of claim 10 wherein the command instruction is a sample-overflow instruction which copies the overflow register to a read register.

12. The method of claim 4 wherein the command instruction is a set-sample instruction which selects the at least one resource element for reading.

13. The method of claim 1 wherein the operand specifier selects the event, a conditioning function, and an event selector.

14. The method of claim 13 wherein the command instruction is a set-event-for-selector instruction which selects the event, the conditioning function, and the event selector according to the operand specifier.

15. The method of claim 13 wherein the command instruction is a set-co-occurrence instruction which provides a value to a register inside a co-occurrence logic unit.

16. The method of claim 13 wherein the command instruction is a set-addend instruction which provides at least an addend value to at least one accumulator.

17. The method of claim 13 wherein the command instruction is a set-latency-experiment instruction which measures a latency of a transaction.

18. The method of claim 13 wherein the command instruction is a set-queue-experiment instruction which determines a queue depth of a series of transactions.

19. The method of claim 13 wherein the command instruction is a set-bandwidth-experiment instruction which determines a bandwidth of an internal bus of the processor.

20. A system comprising:

a bus;

a host processor coupled to the bus for transferring information over the bus; and a processor coupled to the bus, the processor comprising an observation architecture which allows the host to observe and measure in real-time an event inside the processor, the observation architecture comprising:

a command unit for generating control bits from a command instruction, the command instruction being issued by the host processor, the command instruction including at least an opcode and an operand specifier, and a pipeline data path coupled to the command interface for pipelining internally generated signals to produce a measurement of the event based on the control bits, the internally generated signals being representative of the event.

21. The system of claim 20 wherein the pipeline data path comprises:

an event generator unit for encoding the internally generated signals to represent the event;

a selector unit coupled to the event generator for selecting the signals;

a co-occurrence logic unit coupled to the selector unit for performing logic functions on the selected signals; and an accumulator unit coupled to the co-occurrence logic unit for accumulating occurrences of the event represented by the performed signals by an accumulator unit, the accumulated occurrences of the event providing the measurement.

22. The apparatus of claim 21 wherein the pipeline data path comprises:

an event generator unit for encoding the internally generated signals to represent the event;

a selector unit coupled to the event generator for selecting the signals;

a co-occurrence logic unit coupled to the selector unit for performing logic functions on the selected signals; and an accumulator unit coupled to the co-occurrence logic unit for accumulating occurrences of the event represented by the performed signals by an accumulator unit, the accumulated occurrences of the event providing the measurement.

23. An apparatus to allow a host processor to observe and measure in real-time an event inside a device, the apparatus comprising:

a command unit for generating control bits from a command instruction, the command instruction being issued by the host processor, the command instruction including at least an opcode and an operand specifier; and a pipeline data path coupled to the command interface for pipelining internally generated signals to produce a measurement of the event based on the control bits, the internally generated signals being representative of the event.

* * * * *